United States Patent [19]

Matsui et al.

[11] Patent Number: 5,352,641
[45] Date of Patent: Oct. 4, 1994

[54] SILICON NITRIDE COMPOSITE SINTERED BODY AND PROCESS FOR PRODUCING SAME

[75] Inventors: Jin-Joo Matsui; Akira Yamakawa, both of Hyogo, Japan

[73] Assignee: Sumitomo Electric Industries, Ltd., Japan

[21] Appl. No.: 956,887

[22] PCT Filed: Aug. 12, 1992

[86] PCT No.: PCT/JP92/01032

§ 371 Date: Dec. 14, 1992

§ 102(e) Date: Dec. 14, 1992

[87] PCT Pub. No.: WO93/04012

PCT Pub. Date: Mar. 4, 1993

[30] Foreign Application Priority Data

| Aug. 13, 1991 | [JP] | Japan | 3-202827 |
| Aug. 14, 1991 | [JP] | Japan | 3-204309 |
| Aug. 14, 1991 | [JP] | Japan | 3-204312 |
| Dec. 13, 1991 | [JP] | Japan | 3-330814 |
| Dec. 20, 1991 | [JP] | Japan | 3-355981 |
| Jan. 13, 1992 | [JP] | Japan | 4-023206 |

[51] Int. Cl.$^5$ ............................................. C04B 35/58
[52] U.S. Cl. ......................................... 501/92; 501/97; 501/99; 501/154; 264/65; 264/66
[58] Field of Search ............... 501/92, 97, 98, 154, 501/99; 264/65, 66

[56] References Cited

U.S. PATENT DOCUMENTS

| 4,184,882 | 1/1980 | Lange | 501/92 |
| 4,187,116 | 2/1980 | Lange | 501/92 |
| 4,615,990 | 10/1986 | Richon et al. | 501/92 |
| 5,045,513 | 9/1991 | Mizuno et al. | 264/66 |
| 5,134,097 | 7/1992 | Niihara et al. | 501/92 |
| 5,173,458 | 12/1992 | Nishioka et al. | 264/65 |
| 5,177,038 | 1/1993 | Takahashi et al. | 501/92 |
| 5,225,127 | 7/1993 | Nishioka et al. | 264/65 |
| 5,238,882 | 8/1993 | Takahashi et al. | 264/65 |

FOREIGN PATENT DOCUMENTS

| 58-91070 | 5/1983 | Japan . |
| 1275470 | 11/1989 | Japan . |
| 3218971 | 9/1991 | Japan . |

*Primary Examiner*—Mark L. Bell
*Assistant Examiner*—Deborah Jones
*Attorney, Agent, or Firm*—Jordan B. Bierman

[57] ABSTRACT

A composite silicon nitride sintered body formed of silicon nitride as a matrix and silicon carbide having particle sizes of 5 to 500 nm as a phase dispersed in the sintered body, wherein the total amount of dispersed silicon carbide is 1 to 40% by volume based on the sintered body, the proportion by volume of the silicon carbide dispersed in the silicon nitride particles is 5 to 99% based on the total amount dispersed, the remainder being present only in the grain boundary of the silicon nitride, and a process for producing a silicon nitride composite sintered body which includes the steps of adding a sintering aid to amorphous composite powders as starting materials consisting of silicon, nitrogen and carbon to form a green compact; firing the green compact in a nitrogen atmosphere at 1350° to 1650° C. as the primary sintering; firing the same at 1600° to 1900° C. as the secondary sintering; and firing the same at 1800° to 2200° C. to transfer the silicon carbide precipitated in the particles of silicon nitride to the grain boundaries thereof.

12 Claims, No Drawings

SILICON NITRIDE COMPOSITE SINTERED BODY AND PROCESS FOR PRODUCING SAME

TECHNICAL FIELD

The present invention relates to a structural ceramic to be used for automobile parts, wear-resistant tools, etc., and more particularly to a method of increasing the strength and toughness of a silicon nitride ceramic.

BACKGROUND ART

Silicon nitride is a material well balanced in strength, fracture toughness and resistances to-corrosion, abrasion, thermal shock and oxidation, etc., and has become the center of attraction recently as an engineering ceramic for structural members at room temperature and high temperature. However, in order to use silicon nitride ceramics in fields requiring high reliable materials, for example, in automobile parts, etc., it is indispensable to further improve the fracture toughness of the ceramics to overcome the brittleness and increase the strength thereof. An increase in the strength of a ceramic that is a polycrystalline material has heretofore been contrived by refining the individual crystal grain thereof, but this method lowers the fracture toughness of the material which makes it more brittle. Japanese Patent Publication No. 265173/1987 discloses a technique for improving the fracture toughness of a ceramic material by combining a silicon nitride matrix with silicon carbide wherein the whiskers are dispersed in the matrix. It is thought that according to the above-mentioned method the fracture toughness of the ceramic material is improved as the cracks, which may progress and expand during the fracture, are deflected by the whiskers or because extraction or crosslinking of the whiskers takes place. The fracture toughness of the ceramic material is therefore improved by the combination with the whiskers. However, it is difficult to completely remove the agglomerates of the whiskers by a mechanical means and when the size thereof is of the order of 1 to 10 $\mu$m, such whiskers or agglomerates, like the coarse grain, form breaking points, thereby decreasing the strength of the ceramic material. Such a decrease in strength is also observed in a composite material of long fibers. In addition, the composite material of the particle dispersion type that is formed by mechanically mixing the particles having a diameter on the order of microns with the matrix and firing the mixture cannot exhibit the remarkable compounding effect of the dispersed particles in both strength and toughness.

According to the conventional process for producing a composite sintered body such as a process in which silicon nitride, acting as the host phase, is mechanically mixed with silicon carbide in a dispersed phase to form a mixture which is then sintered, it is substantially impossible to form the dispersed particles having a sufficiently small average particle size in the sintered body, since the average particle size of the raw powder material is of the order of one micron or at least several hundred nanometers. Accordingly one cannot expect to increase the strength of the composite sintered body by the above conventional process.

Further Japanese Patent Laid-Open No. 159256/1988 discloses a process in which silicon carbide particles having an average particle size of 1 $\mu$m or smaller are homogeneously dispersed in silicon nitride particles and the silicon nitride particles are subjected to grain growth to form columnar crystals. However, even with the aforementioned composite sintered body of silicon nitride-silicon carbide, a lower proportion of silicon carbide tends to form silicon nitride of columnar crystal, thus minimizing the improvement in strength in spite of some improvement in fracture toughness, whereas a higher proportion of silicon carbide suppresses the formation of silicon nitride of columnar crystal, thereby lowering the fracture characteristics, thereby decreasing the strength.

Under such circumstances, in order to obtain a composite material with fine dispersed particles as a sintered body, it is effective to adopt a process for producing dispersed particles in situ during the sintering by compositing the raw powder materials themselves. For example, as disclosed in Japanese Patent Laid-Open No. 160669/1990, it is possible to cause further refined silicon carbide particles to precipitate by heating an organosilicon compound consisting essentially of silicon, nitrogen and carbon in a non-oxidative gas containing ammonia, adding a sintering aid to the resultant amorphous composite powders, and sintering the composite powders to crystallize silicon carbide in situ during the sintering.

As described above, for the purpose of increasing the strength and toughness of a silicon nitride sintered body, it is effective to produce a composite sintered body of silicon nitride-silicon carbide from a composite material having a sufficiently small size. It has been found, however, that according to the conventional process wherein amorphous composite particles consisting essentially of silicon, nitrogen and carbon as the raw powder materials are sintered as such, the sintering is accompanied with the local formation of a coarse aggregated structure of silicon carbide with an extremely large particle size of 10 $\mu$m or larger, which form breaking points and causes the resultant sintered body to break at a level lower than the strength inherent in the material of the sintered body.

Specifically, the sintering of amorphous composite particles consisting essentially of silicon, nitrogen and carbon brings about the crystallization of silicon nitride as $\alpha$-phase and silicon carbide as $\beta$-phase and final densification in the high-temperature region, but is accompanied by the gas phase-solid phase reaction as represented by the following scheme, thereby locally forming a coarse aggregated structure of silicon carbide:

(1) formation of carbon monoxide gas by the reaction of the free carbon in the powder with the oxygen in the oxidized layer of the powder surface or in the oxide of the sintering aid:

$$C(\text{solid}) + O(\text{solid}) \rightarrow CO(\text{gas}),$$

(2) formation of silicon the dissociation of the silicon-nitrogen bond in the powder:

$$Si_3N_4(\text{solid}) \rightarrow SiC(\text{solid}) + N_2(\text{gas}),$$

(3) formation of silicon carbide by the reaction of the resultant carbon monoxide gas with silicon:

$$CO(\text{gas}) + Si(\text{solid}) + O_2(\text{gas}), \text{ and}$$

(4) formation of silicon carbide by the reaction of the resultant carbon monoxide gas with silicon:

$$CO + Si_3N_4(\text{solid}) \rightarrow SiC(\text{solid}) + NO_2(\text{gas}).$$

According to the conventional process, therefore, it has been extremely difficult to simultaneously improve the strength and toughness of a silicon nitride ceramic, since an increase in strength by refinement of the structure lowers the fracture toughness and conversely, an improvement in the fracture toughness by allowing large columnar crystals to exist by the addition of whiskers or grain growth of silicon nitride lowers the strength. It has, therefore, been a serious subject to reconcile strength with toughness for silicon nitride ceramics.

In view of the above, an object of the present invention is to provide a composite silicon nitride sintered body excellent in both strength and fracture toughness wherein the formation of defects due to coarsening of silicon carbide is suppressed, and a process for producing the sintered body.

DISCLOSURE OF THE INVENTION

The present invention relates to a composite silicon nitride sintered body which comprises silicon nitride as the matrix and silicon carbide having particle sizes of about 5 to 500 nm dispersed in the matrix material, wherein the total amount of dispersed silicon carbide is 1 to 40% (% by volume; the same shall apply hereinafter) based on the sintered body, the proportion by volume of the silicon carbide dispersed in the silicon nitride particles being 5 to 99%, preferably 35 to 65% based on the total amount dispersed, the remainder being present in totality in the grain boundary of the silicon nitride. The silicon nitride particles form network sub-boundaries containing silicon carbide particles as centers. Neither glass phase nor impurity phase exists in the interface between the silicon nitride particles and the silicon carbide particles in the particles and grain boundaries of the silicon nitride. The interfaces are, therefore, firmly bonded to each other.

It is desirable that the silicon nitride matrix have a uniform microstructure comprising columnar crystals with an average particle size of 3 μm or smaller, preferably 1 μm or smaller in terms of the minor axis length and an aspect ratio of 20 or less, preferably 10 or less and/or equiaxed crystals having an equivalent diameter of 1 μm or smaller, and that the sintered body has a structure in which silicon carbide particles of about 5 to 500 nm in particle size are dispersed in the particles and grain boundaries of the silicon nitride. It has been discovered by the present inventors that the sintered body having an a-type dispersed phase of silicon carbide selected from two types of crystal phases, i.e., α-type and β-type, exhibits the highest strength and toughness. It is believed that the above composite effect is exhibited because the α-type silicon carbide has a hexagonal structure which differs from the cubic structure of the β-type silicon carbide. It is therefore compatible with the crystal lattices of silicon nitride having a hexagonal structure for both α-type and β-type, and the silicon carbide matches the interface of the silicon nitride. Moreover, a sintered body having a high shock compressive elasticity limit (Hugoniot's-elastic limit) exceeding 20 GPa is obtained by the above-mentioned structure. Japanese Patent Laid Open No. 160669/1990 discloses a process for producing a composite sintered body from composite or mixed powders of silicon nitride with silicon carbide. On the other hand, the present invention is based on the finding that a particularly excellent performance is obtained by dispersing silicon carbide of α-type structure in the matrix by adjusting sintering conditions.

The process for producing the aforestated composite sintered body comprises the steps of: adding a sintering aid to amorphous powder starting materials comprising silicon, nitrogen and carbon to form a green compact; firing the green compact in a nitrogen atmosphere by a hot pressing process or atmospheric pressure sintering process at 1350° to 1650° C. to crystallize into α-type silicon nitride and simultaneously effect phase transition to β-type crystal phase; firing at 1600° to 1900° C, to allow α- or β-type silicon carbide crystals to precipitate in the particles and/or grain boundaries of the silicon nitride; and firing at 1800° to 2200° C. to transfer the silicon carbide crystals precipitated in the particles of the silicon nitride to the grain boundaries thereof.

As the sintering aid, at least two compounds selected from among alumina, yttria, magnesia and aluminum nitride are used in a total amount of 1 to 15%.

In the firing by a hot pressing process, phase transition of silicon nitride from α-type to β-type is completed in a nonpressurized nitrogen atmosphere and thereafter a pressure of 50 to 400 kg/cm$^2$ is applied to the object to be fired to densify the same. In the firing by an atmospheric pressure sintering process, amorphous powders are heat-treated in advance in a nitrogen atmosphere at 1550° to 1700° C. for 3 to 100 hours to effect crystallization and/or removal of volatile components and attain a packing rate of the green compact of 40% or more.

According to the above-mentioned process, there is obtained a material having a high strength and high toughness, which could not be achieved with the conventional sintered body formed of silicon nitride alone or in combination with whiskers or long fiber-reinforced materials. The inventive effect is achieved only with a composite silicon nitride sintered body which comprises silicon nitride as the matrix and silicon carbide having particle sizes of about 5 to 500 nm as a phase dispersed in the sintered body, in a total amount of 1 to 40% by volume based on the sintered body, the proportion by volume of the silicon carbide dispersed in the silicon nitride particles being 5 to 99% based on the total amount dispersed and the balance being present in the grain boundary of the silicon nitride.

One of the preferred embodiments of the present invention relates to the composite sintered body of silicon nitride and silicon carbide containing 1 to 30% by volume of silicon carbide as the phase dispersed in the silicon nitride and having such a structure that an amorphous phase of silicon carbide is present in the grain boundaries of silicon nitride and microcrystals of silicon carbide having particle sizes of 5 to 500 nm are dispersed in the amorphous phase of silicon carbide.

In the above case, an ordinary glass phase consisting essentially of the oxides derived from the sintering aids as the grain boundary phase of the silicon nitride is present in combination with an amorphous phase of silicon carbide wherein silicon carbide microcrystals having particle sizes of 5 to 500 nm are dispersed. More specifically, the grain boundary structure is of a multilayer structure comprising $Si_3N_4$ particles/amorphous phase of SiC plus dispersed microcrystals of SiC/oxide glass phase/amorphous phase of SiC plus dispersed microcrystals of SiC/$Si_3N_4$ particles or $Si_3B_4$ particles-/oxide glass phase/amorphous phase of SiC plus dispersed microcrystals of SiC/oxide glass phase/$Si_3N_4$ particles.

By the formation of such a polyphase grain boundary structure, the strength σ increases with an increase in the fracture toughness $K_{IC}$ as will be described hereunder.

In the above case, the structure may be such that the content of the amorphous phase of silicon carbide is regulated to 20 to 99% based on the total amount dispersed of the silicon carbide in the composite sintered body of silicon nitride and silicon carbide or the particle size of the silicon carbide microcrystals dispersed in the amorphous phase of silicon carbide is adjusted to 5 to 500 nm.

The process of producing the composite sintered body as mentioned in the preferred embodiment noted above is described hereunder.

For the purpose of producing the composite sintered body of silicon nitride and silicon carbide having the grain boundary structure as mentioned hereinbefore, crystalline powders should not be used as raw silicon carbide material. Instead, a raw powder material having a composition capable of producing silicon carbide in the course of sintering must be used. Examples of the desirable raw material include amorphous powders comprising silicon, nitrogen, carbon and oxygen synthesized by a gas-phase reaction process such as a CVD process, or silicon nitride powder containing carbon dissolved in the state of a solid solution which is obtained by the heat treatment of amorphous silicon nitride powder and carbon powder or carbon precursor such as polysilazane.

The aforesaid raw powder materials together with sintering aids such as $Y_2O_3$, $Al_2O_3$, MgO and AlN are sintered in a nitrogen atmosphere while the temperature and sintering time are regulated. As the sintering process, an ordinary atmospheric pressure sintering process, hot pressuring process, etc., are applicable. In the course of the sintering, however, it is necessary that the sintering be completed before the silicon carbide synthesized in situ is completely crystallized. For this reason, the sintering temperature and sintering time are required to be determined individually through experiments, because they vary depending on the raw powder materials, sintering aid, sintering process and the like.

There is obtained by the above-mentioned process, a composite sintered body of silicon nitride and silicon carbide containing 1 to 30% by volume of silicon carbide as the phase dispersed in-the silicon nitride and having such an intergranular phase of a polyphase structure that an amorphous phase of silicon carbide is present in the grain boundaries of silicon nitride and microcrystals of silicon carbide having particle sizes of 5 to 500 nm are dispersed in the amorphous phase of silicon carbide.

As a means for achieving the object of the present invention, there is also available a process wherein composite crystalline powders consisting essentially of silicon, nitrogen and carbon and having an α-phase silicon nitride crystal phase with a crystallinity of 65% or higher are sintered together with a sintering aid incorporated therein. A preferred embodiment of the above process is the process wherein composite amorphous powders consisting essentially of silicon, nitrogen and carbon are heat-treated at 1550° to 1700° C. in a nitrogen atmosphere for at least 3 hours to produce composite crystalline powders consisting essentially of silicon, nitrogen and carbon having a crystal phase of α-phase silicon nitride with a crystallinity of 65% or higher. The resultant powders mixed with a sintering aid, are used as the starting materials, heat-treated and sintered in the above manner to produce the aforestated sintered body.

There is available another process using mixed powders of amorphous silicon nitride and carbon as the starting materials which comprises adding a sintering aid to mixed powders of amorphous silicon nitride and carbon to form a green compact, firing the green compact at 1350° to 1650° C. so that the carbon forms a solid solution with the silicon nitride, crystallizing the green compact into α-type silicon nitride, while simultaneously carrying out phase transition to a β-type crystal phase, and then reacting the carbon which forms a solid solution with the silicon component in the silicon nitride at 1800° to 2200° C. to precipitate α- or β-type silicon carbide crystals in the particles and/or grain boundaries of the silicon nitride.

The above-mentioned process is characterized by the addition of carbon powders to silicon nitride powders to form mixed powders as the starting materials and the subjecting of the silicon nitride and carbon to solid phase reaction in the final densification step of liquid phase sintering wherein β-type silicon nitride undergoes crystal growth, whereby silicon carbide crystals precipitate. Accordingly, heat treatment at 1600° to 1900° C. is omitted.

In the above-described processes mixing of the starting materials may be carried out by mechanical mixing which is applied to the mixing of the conventional ceramic powders by the use of a ball mill, an attrition mill, an ultrasonic mixer or the like. Firing is preferably carried out by the hot pressing process or atmospheric pressure sintering process in a nitrogen atmosphere.

The sintered body thus obtained has a structure in which the silicon nitride has a matrix structure comprising columnar crystals having an average particle size of 3 μm or smaller, preferably 1 μm or smaller in terms of the minor axis length and an aspect ratio of 20 or less, preferably 10 or less and/or equiaxed crystals having an equivalent diameter of 1 μm or smaller. The sintered body has a structure in which silicon carbide particles having a particle size of about 5 to 500 nm are dispersed in the particles and grain boundaries of the silicon nitride.

According to the present invention, silicon carbide particles having particle sizes of 5 to 500 nm and a large thermal expansion coefficient of $4.4 \times 10^{-6}/°$ C. which is higher than the $3.2 \times 10^{-6}/°$ C. thermal expansion coefficient of silicon nitride are dispersed in the particles of silicon nitride, thus causing residual stress due to the difference in shrinkage factor at the time of cooling from the final sintering temperature to room temperature. The residual stress induces the formation of lattice defects such as transition in the grains of the silicon nitride and as a result, sub-boundaries are formed around the silicon carbide particles, which act as centers, substantially dividing the silicon nitride particles. Therefore, even if the particles are coarsened, stress concentration does not take place at the end of a crack at the time of breaking, whereby lowering of the strength is avoided. In addition, the interfaces between the silicon nitride particles and the silicon carbide particles which are dispersed in the particles of silicon nitride particles or the grain boundaries of silicon nitride particles are free from glass phase or impurity phase and firmly bonded to each other. Consequently, the grain inside and grain boundary of silicon nitride as the host phase are strengthened, and are unlikely to be deformed by the stress applied from outside, thereby forming a material having a high fracture energy in the case of forming fractured surface. As a result, as can be seen from the following Griffith's brittle fracture formulae, strength ($\sigma$) and toughness ($K_{IC}$) are improved simultaneously:

$$K_{IC} = 2\sqrt{\tau E} \quad (1)$$

where
$\tau$: fracture energy
E: modulus of elasticity $$\sigma = K_{IC} Y \sqrt{a} \quad (2)$$

where
Y: shape factor
a: size of defect

Specifically, as a result of reinforcing the grain interior and grain boundary of silicon nitride by the dispersed particles of the silicon carbide, both $\tau$ and E increase, thus causing $K_{IC}$ to increase in Formula (1). In addition, even if coarse particles of silicon nitride exist, they do not form a defect since the grain interior is divided and refined by the formation of sub-boundaries. Further, $\sigma$ increases in proportion to an increase in $K_{IC}$ since a does not increase in Formula (2).

In order to effectively exert such a function, it is necessary to regulate the total amount of silicon carbide dispersed in the composite sintered body and/or the ratio of the amount of silicon carbide dispersed in the grains of silicon nitride and the amount of silicon carbide dispersed in the grain boundaries of silicon nitride. The total amount is preferably 1 to 40%. A Total amount less than 1% results in failure to exert the composite effect, whereas that exceeding 40% inhibits densification during firing, thus leading to the unfavorable result. The ratio of the amount of silicon carbide dispersed in the grains of silicon nitride to the total amount thereof is desirably 5 to 99%, more desirably 35 to 65%, which can exhibit the highest strength and toughness. A ratio thereof less than 5% fails to reflect the effect of the sub-boundary thus formed on the improvement in strength and toughness, while that exceeding 99% is unfavorable, since it undesirably minimizes the amount of silicon carbide dispersed in the grain boundaries of silicon nitride, thus failing to exert the effect on the reinforcement of the grain boundaries. Japanese Patent Laid-Open No. 160669/1990 discloses a structure in which silicon carbide particles of 1 μm or smaller in particle size are dispersed in the grain boundaries of silicon nitride and those of several to several hundred nm in particle size are dispersed inside the grains thereof. High strength and high toughness of the sintered body are, however, attained only when the ratio of the amount of silicon carbide dispersed in the silicon nitride grains to the amount of silicon carbide dispersed in grain boundaries of silicon nitride is regulated to enhance the formation of sub-boundary and interfacial bonding force.

In the composite sintered body of silicon nitride and silicon carbide which has been described as a preferred embodiment of the present invention and contains 1 to 30% of silicon carbide in the silicon nitride, the sintered body has such a structure that an amorphous phase of silicon carbide is present in the grain boundaries of silicon nitride, microcrystals of silicon carbide having particle sizes of 5 to 500 nm are dispersed in the amorphous phase of silicon carbide and a multilayer structure is formed by the oxides derived from the sintering aid as grain boundary phases of silicon carbide.

With such a grain boundary structure, the amorphous phase of silicon carbide can play a role as a binder that firmly bonds silicon nitride particles and reinforces the weak parts of the grain boundaries. Specifically, each of the silicon nitride particles is linked to others by the strong bonding phase and as the result, the host phase is unlikely to be deformed by the stress applied from outside thereby increasing the fracture energy in the case of forming a fractured surface by intergranular cracking. Consequently, as can be seen from the well-known Griffith's brittle fracture formula, the fracture toughness $K_{IC}$ increases with an increase in the fracture energy and the strength also increases with an increase in the fracture toughness $K_{IC}$, since the size of defect is not affected by the above-mentioned intergranular structure.

In the above case, the ratio by volume of the silicon carbide in the amorphous phase to the total dispersed volume of the silicon carbide contained in the composite sintered body of silicon nitride and silicon carbide is preferably 20 to 99%. A ratio by volume of less than 20% causes an excessive crystal phase, almost all the silicon carbide is distributed granularly and makes it impossible to be present as the continuous bonding phase around silicon nitride particles, thereby lowering both strength and fracture toughness. The silicon carbide may be wholly amorphous, but the ratio by volume thereof exceeding 99% undesirably lowers the strength of the amorphous silicon carbide.

The amorphous phase of silicon carbide is effective in that it is reinforced by the precipitation of microcrystals thereof dispersed therein. As mentioned above, however, a ratio by volume of the amorphous phase exceeding 99% lowers the strength despite the reinforcement by precipitation. A particle size of the microcrystals of the dispersed silicon carbide smaller than 5 nm is too small to sufficiently exert the effect on the reinforcement by precipitation, whereas that larger than 500 nm is too large and undesirably brings about intergranular segregation. The microcrystals of the silicon carbide may be of α-type or β-type.

With respect to the process for producing the composite sintered body of the present invention, since the use of amorphous powder consisting of silicon, nitrogen and carbon as the starting materials enables silicon nitride and silicon carbide to be crystallized in situ during firing, it is possible to obtain the composite sintered body having the claimed structure by regulating the firing conditions as will be described hereunder. As compared with the production process disclosed in the Japanese Patent Laid-Open No. 160669/1990, the sintering of the present invention is markedly characterized by the following steps. In the first step, by maintaining the starting material at 1350° to 1650° C. for 0.5 to 50 hours, it is possible to completely crystallize the amorphous powder into α-type silicon nitride, simultaneously cause phase transition in the presence of liquid phase, and uniformly form and distribute the crystal nuclei of β-type silicon nitride. In the second step, by maintaining the material at 1600° to 1900° C. for 0.5 to 50 hours, it is possible to uniformly precipitate the crystals of α- of β-type silicon carbide in the particles and/or grain boundaries of β-type silicon nitride as the host phase, during which the particle size of the precipitated silicon carbide can be varied by varying the temperature. In the third step, by maintaining the material at 1800° to 2200° C. for 0.5 to 50 hours, it is possible to transfer the silicon carbide precipitated inside the particles of silicon nitride to grain boundaries, and thereby vary the ratio of the amount of silicon carbide distributed in the particles of silicon nitride to the amount of the silicon carbide distributed in the grain boundaries of silicon nitride. Thus, in the interface between the silicon nitride and the silicon carbide precipitated in the particles and grain boundaries of the silicon nitride, the lattice planes of both the materials are coincidentally bonded to each other and no glass phase or impurity phase exists, whereby the interracial bonding force in enhanced. The total dispersed mount of silicon carbide can be adjusted by varying the content of carbon in the amorphous powder. It is desirable that at least two sintering aids selected from among alumina, yttria, magnesia and alumina nitride be added in a total amount of 1 to 15% by weight. An amount thereof less than 1% by weight undesirably results in failure to densify the sintered body during firing while an amount exceeding 15% by weight unfavorably causes too much of a glass component in the grain boundaries to exert the inherent properties of the composite silicon nitride sintered body. In the case of firing in a nitrogen atmosphere by the hot pressing process, a densified sintered body is obtainable by initiating pressuring at 50 to 400 kg/cm$^2$ after the completion of $\alpha$-to-$\beta$ transition of the silicon nitride in the first step. The pressuring prior to the completion of the transition brings about a difference in sintering behavior between the inside and outside of the object to be fired, undesirably causing a nonuniform structure. A pressure lower than 50 kg/cm$^2$ leads to an undesirable failure to sufficiently densify the sintered body, whereas a pressure exceeding 400 kg/cm$^2$ unfavorably causes remarkable exudation from the object in the liquid phase during firing.

In the case of firing by the atmospheric pressure sintering process, it is possible to attain a packing ratio of the green compact of 40% or more by weight, to suppress the ratio of weight loss during firing and obtain a densified uniform sintered body under atmospheric pressure by previously heat-treating the amorphous powder in a nitrogen atmosphere at 1550° to 1700° C. for 3 to 100 hours to crystallize the powder and/or remove volatile components. The heat treatment temperature and time outside the aforementioned ranges result in undesirable failure to achieve a packing ratio of the green compact of 40% or more.

In the case where composite crystalline powders are employed as the starting sintering powder materials for production of composite sintered bodies of silicon nitride and silicon carbide according to the process of the present invention, the crystalline powders are more stable to oxidation than the previously used amorphous powders and are freed from, by vaporization, excess carbon, nitrogen and the like usually contained in amorphous powders. Accordingly, the formation of carbon monoxide gas resulting from the reaction between free carbon in the powders and the oxide layer on the powder surfaces is minimized. Thus, the gas phase-solid phase reaction between carbon monoxide gas and Si or Si$_3$N$_4$ is suppressed and the formation of the coarsened agglomerated structures of silicon carbide is decreased, whereby the final sintered body can be improved in its strength.

Further, in the composite crystalline powder, the rate of crystallization into $\alpha$-phase silicon nitride exerts pronounced influences on the strength and toughness of the final sintered body. Specifically, the higher the rate of crystallization into $\alpha$-phase silicon nitride, the less the influence by the above-mentioned gas phase-solid phase reaction with carbon monoxide gas, whereby the occurrence of defects due to coarsened agglomerate of silicon carbide can be lessened. In order to cancel the influence of the occurrence of defects due to the amorphous phase, the necessary crystallization rate is 65% or higher, desirably 85% or higher. Since the crystal phase consists of $\alpha$-phase silicon nitride free from the crystal phase or grains of silicon carbide, the occurrence of defects due to the growth of silicon carbide particles into coarsened agglomeration can be prevented. The formation of $\beta$-phase-silicon nitride in the composite amorphous powders undesirably causes the degradation of sinterability and the growth of abnormal particles.

In the aforementioned case, the composite crystalline powders can be produced by heat-treating amorphous powders consisting essentially of silicon, nitrogen and carbon in a nitrogen atmosphere. The amorphous powders which constitute the starting materials are not specifically limited but may be selected from among composite amorphous powders consisting essentially of silicon, nitrogen and carbon that are synthesized by the vapor deposition process such as the CVD or PVD process; composite amorphous powders obtained by the .gas-phase reaction of an organosilicon compound such as polysilazone which contains silicon, nitrogen and carbon with ammonia; and amorphous silicon nitride powders that are a mixture of an organosilicon compound with carbon powders.

Among them, the composite amorphous powders consisting essentially of silicon, nitrogen and carbon that are synthesized by the vapor deposition process are preferably employed and heat-treated to produce the objective composite sintered body. However, the higher the carbon content in the amorphous composite powders, the lower the rate of crystallization into $\alpha$-phase silicon nitride. For example, heat treatment at 1500° C. for 12 hours is required to crystallize amorphous silicon nitride powders free from carbon into. $\alpha$-phase silicon nitride at a crystallization efficiency of 85% but amorphous powders having a carbon content of 9% by weight are scarcely crystallized at 1500° C. Amorphous composite powders with 9% by weight of carbon are only 34% crystallized by heat treatment at 1600° C. for 16 hours and, when heat treated at an elevated temperature of 1750° C., produce undesirable $\beta$-phase silicon nitride.

In order to produce crystalline composite powders having a crystallization rate of 65% or higher and $\alpha$-phase silicon nitride as the crystal phase, it is necessary to carry out heat treatment at 1550° to 1700° C. in a nitrogen atmosphere for at least 3 hours in accordance with the carbon content in the amorphous composite powders consisting essentially of silicon, nitrogen and carbon. A carbon content therein exceeding 10% by weight results in failure to densify the crystalline composite powders at the time of sintering, whereas a carbon content of less than 1% by weight leads to insufficient formation of silicon carbide particles in the finely sintered body, thus failing to exert any reinforcement effect. Accordingly, the carbon content therein is desirably in the range of 1 to 10% by weight.

As described hereinbefore, the carbon content in the amorphous composite powders is an important factor. The residual free carbon in the above powders can be removed through oxidation by additionally heat-treating the crystalline composite powders obtained by heat-treating amorphous composite powders, or crystalline composite powders incorporated with a sintering aid or a green compact thereof at 400° to 1000° C. in the air for 0.5 to 50 hours. Hence, the aforementioned treatment removes unnecessary carbon and enables the production of the final sintered body having further fine particles which is excellent in strength and toughness.

Compared to amorphous composite powders, crystalline composite powders are rich in sinterability and can be made into a highly dense composite sintered body of silicon nitride and silicon carbide by adding thereto sintering aids such as $Y_2O_3$, $Al_2O_3$, MgO or AlN and sintering them in a nitrogen atmosphere. As the sintering process, besides the hot pressing process, gas-pressure sintering and atmospheric-pressure sintering are also applicable. Since, mentioned above, the gas phase-solid phase reaction originating in amorphous powder is suppressed and the occurrence of local defect due to coarsening is eliminated in the sintering process, a composite sintered body having fine silicon carbide particles having particle sizes of 5 to 500 nm dispersed and precipitated therein is produced, thus attaining enhanced strength and toughness of the final sintered body.

In the process in which mixed powders of amorphous silicon nitride and carbon are employed as the starting material, it has been found that a sintered body having high strength and high toughness is obtained by firing a mixture of amorphous silicon nitride with carbon incorporated with sintering aids, since the mixture forms silicon carbide in the firing step and produces composite a sintered body of silicon nitride and silicon carbide-in the sintering steps, in comparison with a sintered body obtained from silicon nitride alone or by mechanically mixing crystalline powders of silicon nitride and silicon carbide. The greatest feature of the process for producing the sintered body having such high strength and high toughness resides in the solid phase reaction of amorphous silicon nitride with carbon. Specifically, the process comprises the steps of allowing carbon to dissolve in the state of solid solution within amorphous silicon nitride particles in the temperature range of 1350° to 1650° C. and, after the occurrence of crystallization of silicon nitride into $\alpha$-phase crystals and phase transition from $\alpha$-phase to $\beta$-phase, reacting the carbon in the solid solution with the silicon in the silicon nitride to precipitate silicon carbide in the particles and/or grain boundaries of silicon nitride. This enables the production of a sintered body having superfine particles of silicon carbide homogeneously dispersed therein, as compared with the conventional process for producing composite materials which comprises mechanically mixing and firing crystalline powders of silicon nitride with crystalline powders or whiskers of silicon carbide.

The values of $\tau$ and E in the formula (1) are increased in the aforestated case, thus increasing the value of $K_{IC}$ by reinforcement of the inside and grain boundaries of silicon nitride by the dispersed particles of silicon carbide. Even if coarse particles of silicon nitride exist, no defect is caused by reason of the formation of sub-boundaries which divide and refine the particles, and the value of $\sigma$ increases in proportion to an increase in the value of $K_{IC}$, since the value of a does not increase in the formula (2).

In the production of the composite sintered body of silicon nitride and silicon carbide having the above-described intergranular structure, crystalline powders used as raw silicon carbide are not necessary. Raw powder materials having such a composition that can produce silicon carbide in the course sintering can be used. Desirable examples of such raw powder materials include amorphous powders consisting of silicon, nitrogen, carbon and oxygen that are synthesized by the gas phase reaction process such as CVD process, silicon nitride powders containing carbon in the state of a solid solution that are obtained by heat treatment of amorphous silicon nitride powders with carbon particles or carbon precursors such as polysilazane.

The raw powder materials mixed with sintering aids such as $Y_2O_3$, $Al_2O_3$, MgO or AlN are sintered in a nitrogen atmosphere by regulating the sintering temperature and period of time through conventional atmospheric-pressure sintering, hot pressing or the like. It is indispensable in the sintering, however, that sintering is finished prior to the complete crystallization of silicon carbide synthesized in situ. Thus, it is necessary to determine individually, through respective experiments, the sintering temperature and sintering time, since they vary depending on the raw powder material and sintering aid to be used, sintering method, or the like.

BEST MODE FOR CARRYING OUT THE INVENTION

Now, the present invention will be described in further detail with reference to the following Examples.

EXAMPLE 1

A sintering aid was added to an amorphous powder consisting of silicon, nitrogen and carbon, to from a green compact, which was fired in a nitrogen atmosphere by the hot pressing process. Table 1 gives the composition and amount of the sintering aid, firing conditions and hot pressing pressure, total amount of silicon carbide dispersed in the resultant sintered body, the ratio thereof dispersed in silicon nitride particles, and deflection strength and fracture toughness of the sintered body in each of the examples in which firing was effected by the hot pressing process.

TABLE 1

| Ex. No. | Sintering aid compn. *1 | amt. *2 | Firing conditions (hot pressing) *3 | | | Press. *4 | Vi/Vt *5 (SiC) | Deflective strength (kg/mm$^2$) | Fracture toughness (MPam$^{1/2}$) |
|---|---|---|---|---|---|---|---|---|---|
| | | | (i) temp./ time | (ii) temp./ time | (iii) temp./ time | | | | |
| 1-1 | 5Y2Al1N | 8 | 1600/3 | 1750/3 | 1850/3 | 250 | 59/25 | 205 | 11.5 |
| 1-2 | " | " | 1600/3 | 1800/3 | 1900/5 | " | 40/25 | 265 | 16.6 |
| 1-3 | " | " | 1600/3 | 1900/3 | 1950/5 | " | 36/25 | 220 | 13.1 |
| 1-4 | " | " | 1600/2 | 1900/2 | 1900/2 | 350 | 45/10 | 198 | 10.2 |
| 1-5 | " | " | " | " | " | " | 45/20 | 249 | 15.6 |
| 1-6 | " | " | " | " | " | " | 45/30 | 235 | 12.8 |
| 1-7 | 7Y4A | 11 | 1600/3 | 1800/2 | 1900/3 | 250 | 45/25 | 216 | 11.6 |
| 1-8 | " | " | 1600/3 | 1900/2 | 1900/5 | " | 35/25 | 190 | 9.6 |

TABLE 1-continued

| Ex. No. | Sintering aid compn. *1 | amt. *2 | Firing conditions (hot pressing) *3 | | | Press. *4 | Vi/Vt *5 (SiC) | Deflective strength (kg/mm$^2$) | Fracture toughness (MPam$^{1/2}$) |
|---|---|---|---|---|---|---|---|---|---|
| | | | (i) temp./ time | (ii) temp./ time | (iii) temp./ time | | | | |
| 1-9 | " | " | 1600/3 | 1900/10 | 1900/5 | " | 15/25 | 158 | 8.5 |
| 1-10 | 5Y2A1N | 7 | 1600/3 | 1750/4 | 1900/3 | 200 | 60/29 | 238 | 14.4 |
| 1-11 | " | " | 1650/3 | 1800/4 | 1920/3 | " | 40/29 | 232 | 13.9 |

*1 abbreviation of composition:
Ex. 5Y ... 5 wt. % Y$_2$O$_3$
2A ... 2 wt. % Al$_2$O$_3$
*2 unit of amount: wt. %
*3 (i) to (iii):
first to third steps unit of temperature: °C.
unit of time: hour
*4 unit of pressure: kg/cm$^2$
*5 Vt: total amount dispersed of silicon carbide (vol %)
Vi: ratio of silicon carbide dispersed in silicon nitride particles to the total amount dispersed (vol %)
*6 Si—C—N powders available from Mitsubishi Gas Chemical Co., Inc. were employed as the starting materials.

EXAMPLE 2

Amorphous silicon nitride powder and carbonized powder (acetylene black) and a sintering aid (5 wt. % Y$_2$O$_3$ and 2 wt. % Al$_2$O$_3$) were mixed in a ball mill, press-formed and then fired by the hot pressing process. Table 2 gives the amount of carbon added, sintering conditions, content of silicon carbide in the sintered body thus obtained and the three-point flexural strength and fracture toughness of the sintered body.

TABLE 2

| Ex. No. | Amt. of carbon added (wt. %) | Sintering conditions | | Content of SiC (vol %) | Flexural strength (kg/mm$^2$) | Fracture toughness (MPam$^{1/2}$) |
|---|---|---|---|---|---|---|
| | | 1st step (°C. × time) | 2nd step (°C. × time) | | | |
| 2-1 | 3.0 | 1600 × 3 | 1800 × 4 | 9.8 | 160 | 7.8 |
| 2-2 | 6.0 | 1600 × 3 | 1800 × 4 | 19.8 | 178 | 9.7 |
| 2-3 | 7.5 | 1600 × 3 | 1800 × 4 | 25 | 201 | 13.9 |
| 2-4 | 8.9 | 1600 × 3 | 1800 × 4 | 29.8 | 189 | 11.7 |
| 2-5 | 7.5 | 1550 × 3 | 1750 × 4 | 25 | 189 | 10.6 |
| 2-6 | 7.5 | 1650 × 3 | 1900 × 4 | 25 | 229 | 15.8 |

COMPARATIVE EXAMPLES 1 TO 6

α-Phase crystalline powder of silicon nitride incorporated with a sintering aid (5 wt. % Y$_2$O$_3$ and 2 wt. % Al$_2$O$_3$) was press-formed and then fired by the hot pressing process (No. 1 to No. 3). The mixture of crystalline powder of silicon nitride with carbon was processed in the same manner as above. Table 3 gives the amount of carbon added, sintering conditions, amount of silicon carbide dispersed in the sintered body thus obtained, and the three-point flexural strength and fracture toughness of the sintered body.

TABLE 3

| Comp. Ex. No. | Amt. of carbon added (wt. %) | Sintering conditions | | Content of SiC (vol %) | Flexural strength (kg/mm$^2$) | Fracture toughness (MPam$^{1/2}$) |
|---|---|---|---|---|---|---|
| | | 1st step (°C. × time) | 2nd step (°C. × time) | | | |
| 1 | 0 | 1450 × 3 | 1700 × 4 | — | 110 | 5.3 |
| 2 | 0 | 1600 × 3 | 1800 × 4 | — | 123 | 5.7 |
| 3 | 0 | 1650 × 3 | 1900 × 4 | — | 95 | 5.9 |
| 4 | 5 | 1600 × 3 | 1800 × 4 | 0 | 86 | 4.1 |
| 5 | 10 | 1600 × 3 | 1800 × 4 | 0 | 75 | 3.8 |
| 6 | 15 | 1600 × 3 | 1800 × 4 | 0 | 55 | 3.2 |

COMPARATIVE EXAMPLES 7 to 12

α-Phase crystalline powder of silicon nitride, β-phase crystalline powder of silicon carbide (0.5 μm in average grain size) and a sintering aid (5 wt. % Y$_2$O$_3$ and 2 wt. % Al$_2$O$_3$) were mixed in a ball mill, press-formed and then fired by the hot pressing process. Table 4 gives the amount of silicon carbide added, sintering conditions and the three-point flexural strength and fracture toughness of each sintered body thus obtained.

TABLE 4

| Comp. Ex. No. | Amt. of SiC added (wt. %) | Sintering conditions | | Content of SiC (vol %) | Flexural strength (kg/mm$^2$) | Fracture toughness (MPam$^{1/2}$) |
|---|---|---|---|---|---|---|
| | | 1st step (°C. × time) | 2nd step (°C. × time) | | | |
| 7 | 10 | 1600 × 3 | 1800 × 4 | 10 | 110 | 5.3 |
| 8 | 20 | 1600 × 3 | 1800 × 4 | 20 | 123 | 5.7 |
| 9 | 25 | 1600 × 3 | 1800 × 4 | 25 | 131 | 5.9 |
| 10 | 30 | 1600 × 3 | 1800 × 4 | 30 | 124 | 4.7 |
| 11 | 25 | 1550 × 3 | 1750 × 4 | 25 | 119 | 5.6 |
| 12 | 25 | 1650 × 3 | 1900 × 4 | 25 | 129 | 6.0 |

EXAMPLE 3

A sintering aid (5 wt. % Y$_2$O$_3$ and 2 wt. % Al$_2$O$_3$) was added to amorphous powders consisting of silicon, nitrogen and carbon (equivalent to SiC of 25% by volume, available from Mitsubishi Gas Chemical Co., Inc.), to from a green compact, which was fired in a nitrogen atmosphere by the hot pressing process and formed into several sintered bodies each having silicon carbide particles of 5 to 500 nm in particle size with different crystal phases dispersed in the particles and grain boundaries of silicon nitride by varying the sintering temperature. Table 5 gives the sintering temperature, crystal phase of silicon carbide, and strength (three-point flexural strength at room temperature), fracture toughness and shock compressive elasticity limit of each of the sintered bodies thus obtained, and as the comparative example, the result of the sintered body obtained by firing in the same manner as above, a starting material consisting of α-type crystalline powder of silicon nitride alone incorporated with a sintering aid.

TABLE 7-continued

| No. | Flexural strength (kg/mm$^2$) | Fracture toughness (MPam$^{1/2}$) |
| --- | --- | --- |
| 4-1 | 166 | 6.54 |
| 4-2 | 151 | 6.32 |
| 4-3 | 187 | 7.35 |
| 4-4 | 173 | 6.99 |
| 4-5 | 175 | 6.78 |
| Comp. Ex. No. 15 | 146 | 6.74 |
| 4-6 | 195 | 9.21 |
| 4-7 | 211 | 10.08 |
| 4-8 | 179 | 7.63 |
| 4-9 | 214 | 10.78 |
| 4-10 | 190 | 8.35 |

TABLE 5

| | Sintering temp. (°C.) | Crystal phase of SiC | Strength (kg/mm$^2$) | Fracture toughness (MPam$^{1/2}$) | Shock compressive elasticity limit (GPa) |
| --- | --- | --- | --- | --- | --- |
| Ex. No. | | | | | |
| 3-1 | 1650 | α | 158 | 7.8 | 25 |
| 3-2 | 1700 | α | 168 | 8.9 | 30 |
| 3-3 | 1750 | β | 125 | 6.5 | 15 |
| 3-4 | 1800 | α + β | 136 | 6.8 | 18 |
| 3-5 | 1850 | β | 115 | 5.8 | 15 |
| 3-6 | 1900 | α | 179 | 10.5 | 32 |
| Comp. Ex. No. 13 | 1900 | — | 104 | 6.1 | 14 |

*single-component sintered body of silicon nitride (without silicon carbide)

EXAMPLE 4

Amorphous composite powders consisting mainly of silicon, nitrogen and carbon (Si—C—N) with different carbon contents were heat-treated in nitrogen and in the air. A sintering aid (5 wt. % Y$_2$O$_3$ and 2 wt. % Al$_2$O$_3$) was added to the above heat-treated powders, and the mixture was sintered at 1850° C. for 2 hours by the hot pressing process. As comparative examples, amorphous powders that had not been heat-treated were fired in the same manner as above. Table 6 gives the contents of carbon in solid solution and free carbon in each amorphous powder, heat treatment conditions and the amount of free carbon after heat treatment. Table 7 gives the flexural strength and fracture toughness of the sintered body thus obtained.

EXAMPLE 5

An amorphous powder of Si$_3$N$_4$ incorporated with 1.7 wt. % of carbon powder was heat-treated at 1600° C. in a nitrogen atmosphere for 8 hours to synthesize α-type crystalline Si$_3$N$_4$ powder containing carbon as a solid solution. The powder thus obtained was mixed with a sintering aid (5 wt. % Y$_2$O$_3$ and 2 wt. % Al$_2$O$_3$) to form a green compact, which was subjected to atmospheric-pressure sintering in a nitrogen atmosphere at 1850° C. for 2 hours. The composite sintered body of Si$_3$N$_4$-SiC was measured for the total amount of dispersed silicon carbide (Vf), ratio of amorphous SiC in Vf, crystal form and crystal size or SiC crystals dispersed in amorphous SiC and three-point flexural strength at room temperature and fracture toughness K$_{IC}$ of the sintered body thus obtained. The results are given in Table 8.

TABLE 6

| | Amorphous powder | | Heat treatment conditions | | Amt. of free carbon after heat treatment (wt. %) |
| --- | --- | --- | --- | --- | --- |
| No. | carbon in solid soln. (wt. %) | free carbon (wt. %) | 1st step in N$_2$, temp. (°C.) × time (hr) | 2nd step in air, temp. (°C.) × time (hr) | |
| Comp. Ex. No. 14 | 2.3 | 2.7 | without heat treatment | | — |
| 4-1 | 2.3 | 2.7 | 1600 × 8 | 500 × 2 | 0.39 |
| 4-2 | 2.3 | 2.7 | 1600 × 8 | 800 × 5 | 0.23 |
| 4-3 | 2.3 | 2.7 | 1600 × 30 | 800 × 5 | 0.21 |
| 4-4 | 2.3 | 2.7 | 1700 × 8 | 500 × 2 | 0.37 |
| 4-5 | 2.3 | 2.7 | 1700 × 8 | 800 × 5 | 0.11 |
| Comp. Ex. No. 15 | 4.3 | 5.5 | without heat treatment | | — |
| 4-6 | 4.3 | " | 1600 × 10 | 500 × 2 | 0.31 |
| 4-7 | 4.3 | " | 1600 × 50 | 700 × 5 | 0.20 |
| 4-8 | 4.3 | " | 1600 × 80 | 800 × 5 | 0.19 |
| 4-9 | 4.3 | " | 1700 × 10 | 500 × 2 | 0.36 |
| 4-10 | 4.3 | " | 1700 × 20 | 800 × 5 | 0.14 |

TABLE 7

| No. | Flexural strength (kg/mm$^2$) | Fracture toughness (MPam$^{1/2}$) |
| --- | --- | --- |
| Comp. Ex. No. 14 | 125 | 5.91 |

EXAMPLE 6

A sintering aid (5 wt. % Y$_2$O$_3$, 2 wt. % Al$_2$O$_3$ and 1 wt. % AlN) was added to an amorphous powder having a composition of Si-32 wt % N-8wt % C-2 wt. % 0 that had been synthesized by the known CVD process and mixed to form a green compact, which was sintered in a nitrogen atmosphere at 1900° C. under 250 kg/mc² pressure for 2 hours by the hot pressing process. The intergranular structure and the properties of the sintered body thus obtained were examined in the same manner as that of the Example 5. The results are given in Table 8.

EXAMPLE 7

An amorphous $Si_3N_4$ powder incorporated with 5 wt. % of carbon powder was heat treated in a nitrogen atmosphere at 1600° C. for 8 hours to synthesize $\alpha$-type crystalline silicon nitride powders containing carbon particles as a solid solution. A sintering aid (5 wt. % $Y_2O_3$ and 2 wt. % $Al_2O_3$) was added to the resultant powders and mixed to form a green compact, which was subjected to atmospheric-pressure sintering in a nitrogen atmosphere at 1850° C. for 2 hours. The intergranular structure and properties of the sintered body thus obtained were examined in the same manner as that of the Example 5. The results are given in Table 8.

EXAMPLE 8

An amorphous $Si_3N_4$ powder incorporated with polysilazane in a ratio by weight of 1:1 were heat-treated in a nitrogen atmosphere at 1600° C. for 8 hours to synthesize $\alpha$-type crystalline $Si_3N_4$ powder containing carbon particles as solid solution. A sintering aid (5 wt. % $Y_2O_3$ and 2 wt. % $Al_2O_3$) was added to the resultant powder and mixed to form a green compact, which was subjected to atmospheric-pressure sintering in a nitrogen atmosphere at 1750° C. for 2 hours. The intergranular structure and properties of the sintered body thus obtained were examined in the same manner as that of the Example 5. The results are given in Table 8.

EXAMPLE 9

A sintering aid (5 wt. % $Y_2O_3$ and 2 wt. % $Al_2O_3$) was added to an amorphous powder having a composition consisting of Si-33 wt % N-9.6 wt % C-2.6 wt. % O that had been synthesized by the known CVD process and mixed to form a green compact, which was sintered in a nitrogen atmosphere at 1900° C. for 2 hours. The intergranular structure and the properties of the sintered body thus obtained were examined in the same manner as that of the Example 5. The results are given in Table 8.

TABLE 8

| Ex. No. | Total amt. dispersed of SiC, Vf (vol %) | Ratio of amorph. components in Vf (vol %) | Crystal form of SiC/ crystal size | Flexural strength (kg/mm²) | Fractural toughness (MPam$^{1/2}$) |
|---|---|---|---|---|---|
| 5 | 5 | 80 | $\alpha$/100 nm $\beta$/200 nm | 170 | 8.8 |
| 6 | 25 | 45 | $\beta$/70 nm | 200 | 10.5 |
| 7 | 15 | 60 | $\beta$/100 nm $\beta$/200 nm | 185 | 9.0 |
| 8 | 10 | 35 | $\beta$/50 nm | 195 | 9.5 |
| 9 | 30 | 50 | $\beta$/90 nm | 158 | 7.4 |

COMPARATIVE EXAMPLE 16

A sintering aid (5 wt. % $Y_2O_3$ and 2 wt. % $Al_2O_3$) was added to $\alpha$-type crystalline carbon nitride powder and mixed therewith to form a green compact, which was subjected to atmospheric pressure sintering in a nitrogen atmosphere at 1850° C. for 2 hours. The composite sintered body thus obtained was measured for the total amount of dispersed silicon carbide (Vf), ratio of amorphous SiC in Vf, crystal form and crystal size of SiC carbide crystals and three-point flexural strength at room temperature and fracture toughness $K_{IC}$ of the sintered body thus obtained. The results are given in Table 9.

COMPARATIVE EXAMPLE 17

A sintering aid (5 wt. % $Y_2O_3$ and 2 wt. % $Al_2O_3$) was added to a mixture of $\alpha$-type crystalline $Si_3N_4$ powder and $\beta$-type crystalline SiC powder and mixed therewith to form a green compact, which was subjected to atmospheric-pressure sintering in a nitrogen atmosphere at 1850° C. for 2 hours. The resultant sintered body was examined in the same manner as that of the Comparative Example 16. The results are given in Table 9.

TABLE 9

| Comp. Ex. No. | Total amt. dispersed of SiC, Vf (vol %) | Ratio of amorph. components in Vf (vol %) | Crystal form of SiC/ crystal size | Flexural strength (kg/mm²) | Fracture toughness (MPam$^{1/2}$) |
|---|---|---|---|---|---|
| 16 | 0 | 0 | — | 105 | 5.5 |
| 17-1 | 25 | 0 | $\beta$/300 nm | 125 | 6.1 |
| 17-2 | 15 | 0 | $\beta$/300 nm | 120 | 5.8 |

It can be seen from the results given in Tables 8 and 9 that as compared with the comparative examples relating to the convention $Si_3M_4$ sintered body or the composite sintered body of $Si_3N_4$-SiC without amorphous SiC, the composite sintered body of $Si_3N_4$- SiC according to the present invention is surprisingly superior in both strength and fracture toughness as it contains amorphous silicon carbide having fine $\alpha$-or $\beta$-type SiC crystals dispersed therein and in the grain boundaries of $Si_3N_4$.

EXAMPLE 10 AND COMPARATIVE EXAMPLES 18 TO 23

Amorphous composite Si—N—C powders having different carbon contents that had been synthesized by the well-known CVD process were heat-treated in a nitrogen atmosphere under the conditions given in Table 10. The resultant crystalline composite powders were measured for the rate of crystallization into $\alpha$-phase silicon nitride. A sintering aid (5 wt. % $Y_2O_3$ and 2 wt. % $Al_2O_3$) was added to the resultant powders and mixed, and the mixture was sintered in a nitrogen atmosphere under a pressure of 200 kg/cm₂ at 1850° C. for 2 hours by the hot processing process. The sintered bodies thus obtained were measured for flexural strength ($\sigma$) and fracture toughness ($K_{IC}$). The results, together with the carbon content in the amorphous powder, heat treatment conditions and crystallinity are given in Table 10.

TABLE 10

| No. | Carbon content (wt. %) | Heat treatment conditions temp. (°C.) | time (hr) | Crystn. rate (%) | Flexural strength (kg/mm²) | Fracture toughness (MPam^(1/2)) |
|---|---|---|---|---|---|---|
| Comp. Ex. No. 18 | 1.7 | without heat treatment | | 0 | 101 | 5.81 |
| 10-1 | 1.7 | 1550 | 8 | 70 | 125 | 6.33 |
| 10-2 | 1.7 | 1550 | 16 | 88 | 148 | 6.94 |
| 10-3 | 1.7 | 1600 | 16 | 95 | 152 | 7.13 |
| Comp. Ex. No. 19 | 2.8 | without heat treamtnet | | 0 | 112 | 5.95 |
| 10-4 | 2.8 | 1550 | 10 | 66 | 138 | 6.06 |
| 10-5 | 2.8 | 1600 | 16 | 87 | 158 | 7.02 |
| Comp. Ex. No. 20 | 5.6 | without heat treatment | | 0 | 10 | 5.85 |
| 10-6 | 5.6 | 1600 | 8 | 70 | 139 | 6.11 |
| 10-7 | 5.6 | 1600 | 24 | 81 | 155 | 6.89 |
| 10-8 | 5.6 | 1650 | 8 | 86 | 159 | 6.77 |
| 10-9 | 5.6 | 1650 | 16 | 97 | 178 | 8.97 |
| 10-10 | 5.6 | 1700 | 16 | 100 | 189 | 9.59 |
| Comp. Ex. No. 21 | 8.7 | without heat treatment | | 0 | 136 | 6.38 |
| Comp. Ex. No. 22 | 8.7 | 1600 | 7 | 7 | 95 | 6.20 |
| Comp. Ex. No. 23 | 8.7 | 1600 | 16 | 15 | 101 | 6.16 |
| 10-11 | 8.7 | 1600 | 50 | 92 | 198 | 9.28 |
| 10-12 | 8.7 | 1700 | 16 | 96 | 201 | 10.1 |
| 10-13 | 8.7 | 1700 | 30 | 100 | 210 | 11.5 |

EXAMPLE 11 AND COMPARATIVE EXAMPLES 24 TO 27

Amorphous composite Si—N—C powders having a carbon content of 10 wt. % or higher were heat treated in a nitrogen atmosphere at 1700° C. for 5 to 10 hours so as to attain a rate of crystallization of 95% or more. The resultant crystalline composite powders were further heat-treated in the air under conditions given in Table 11 to remove free carbon through oxidation. Thereafter, the crystalline powders were incorporated with a sintering aid and sintered by the hot pressing process in the same manner as that of the Example 10. Measurements were made of flexural strength ($\sigma$) and fracture toughness ($K_{IC}$) for each of the resultant sintered bodies. Table 11 gives the results of the above measurements together with the carbon contents in the amorphous composite powders and heat treatment conditions in the air.

TABLE 11

| No. | Carbon content (wt. %) | Heat treatment conditions temp. (°C.) | time (hr) | Flexural strength (kg/mm²) | Fracture toughness (MPam^(1/2)) |
|---|---|---|---|---|---|
| Comp. Ex. No. 24 | 15 | without heat treatment | | 86 | 4.56 |
| Comp. Ex. No. 25 | 15 | 200 | 2 | 94 | 5.12 |
| 11-1 | 15 | 500 | 2 | 142 | 7.41 |
| 11-2 | 15 | 800 | 5 | 187 | 8.25 |
| Comp. Ex. No. 26 | 20 | without heat treatment | | 65 | 4.80 |
| Comp. Ex. No. 27 | 20 | 200 | 2 | 75 | 4.98 |
| 11-3 | 20 | 500 | 2 | 138 | 6.63 |
| 11-4 | 20 | 800 | 5 | 179 | 7.89 |

INDUSTRIAL APPLICABILITY

According to the present invention, silicon nitride ceramics superior to the conventional ones in both strength and fracture toughness can be obtained and utilized as a high-temperature structure material typified by an automobile engine which requires a high performance in strength and toughness and high reliability.

We claim:

1. A silicon nitride composite sintered body which comprises silicon nitride as a matrix and silicon carbide particles having of 5 to 500 nm as a phase dispersed in the sintered body, wherein the total amount dispersed of silicon carbide is 1 to 40% by volume based on the sintered body, the proportion by volume of the silicon carbide dispersed in the silicon nitride particles is 5 to 99% based on the total amount dispersed, the remainder being present in the grain boundary of the silicon nitride.

2. The silicon nitride composite sintered body according to claim 1 wherein the proportion by volume of the silicon carbide dispersed in the silicon nitride particles is 35 to 65% based on the total amount of silicon carbide dispersed.

3. The silicon nitride composite sintered body according to claim 1 wherein neither glass phase nor an impurities phase exists int he interfaces between said silicon nitride particles and said silicon carbide particles dispersed in the particles and grain boundaries of the silicon nitride, the interfaces being firmly bonded to each other.

4. A composite sintered body of silicon nitride-silicon carbide containing 1 to 30% by volume of silicon carbide as a dispersed phase in the silicon nitride, wherein an amorphous phase of silicon carbide is present in the grain boundaries of silicon nitride and microcrystals of silicon carbide having particle sizes of 5 to 500 nm. are dispersed in said amorphous phase of silicon carbide.

5. The composite sintered body of silicon nitride-silicon carbide according to claim (4), wherein the proportion of the amorphous phase of silicon carbide is 20 to 99% by volume based on the total amount dispersed of silicon carbide.

6. A process for producing a silicon nitride composite sintered body comprising;
   adding at least one sintering aid selected from the group consisting of alumina, yttria, magnesia, and aluminum nitride to an amorphous composite powder starting material comprising silicon, nitrogen, and carbon, said sintering aid being present in a total amount of 1 to 15% by weight; to form a green compact,
   firing, as a primary firing, said green compact in a nitrogen atmosphere by a hot pressing or an atmospheric-pressure sintering process at 1350° to 1650° C. to crystallize said starting material into $\alpha$-silicon nitride, and simultaneously effect phase transition to a $\beta$-crystal phase;

conducting a secondary firing at 1600°0 C. to 1900° C. to allow α- or β- silicon carbide crystals to precipitate in particles of the silicon nitride; and firing at 1800° C. to 2200° C. to transfer a portion of the silicon carbide crystals precipitated in the particles of the silicon nitride to grain boundaries thereof.

7. The process according to claim 6 wherein amorphous composite powders consisting of silicon, nitrogen and carbon are heat-treated in a nitrogen atmosphere at 1550° to 1700° C. for at least 3 hours and the resultant composite powders consisting mainly of silicon, nitrogen and carbon and having an α-crystal phase of silicon nitride with a rate of crystallization of 65% or more are employed as the starting material.

8. The process according to claim 7 wherein the carbon content in said amorphous composite powders is 1 to 10% by weight.

9. The process according to claim 6, wherein at least two sintering aids selected from among alumina, yttria, magnesia and aluminum nitride are added in their total amount of 1 to 15% weight.

10. The process according to claim 7 wherein the composite powders having an α-crystal phase or composite powders having an α-crystal phase incorporated with sintering aids or the green compact thereof are heat-treated in the air at 400° to 1000° C. for 0.5 to 50 hours to remove residual free carbon through oxidation.

11. A process for producing a silicon nitride composite sintered body comprising;

adding at least two sintering aids selected from the group consisting of alumina, yttria, magnesia, and aluminum nitride to an amorphous composite powder starting material comprising mixed powders of amorphous silicon nitride and carbon, to form a green compact, in which said sintering aid is present in a total amount of 1% to 15% by weight;

firing, as a primary firing, the green compact in a nitrogen atmosphere by a hot pressing or an atmospheric pressure sintering process at 1350° C. to 1650° C. to form a solid solution of carbon and silicon nitride, crystallize said silicon nitride into α-silicon nitride, and simultaneously effect phase transition to a β-crystal phase;

and firing at 1800° C. to 2200° C. to precipitate α- or β-silicon carbide crystals in particles of the silicon nitride, and to transfer a portion of the silicon carbide crystals precipitated in the particles of silicon nitride to grain boundaries thereof.

12. A process for producing a silicon nitride composite sintered body comprising;

conducting a primary firing of an amorphous composite powder, comprising amorphous silicon nitride and carbon, in a nitrogen atmosphere by a hot pressing or an atmospheric-pressure sintering process at 1350° to 1600° C., to form a solid solution of carbon and silicon nitride, crystallize said silicon nitride into α-silicon nitride, and cause a phase transition to a β-crystal phase to form a resulting material;

adding to the resulting material at least two sintering aids selected from the group consisting of alumina, yttria, magnesia, and aluminum nitride, in a total amount of 1% to 15% by weight;

firing the resulting mixture at a temperature of 1800° C. to 2200° C. to precipitate α- or β-silicon carbide crystals in the particles of the silicon nitride, and transfer a portion of the silicon carbide crystals precipitated in particles of the silicon nitride to grain boundaries thereof.

* * * * *